(12) United States Patent
Cardamore et al.

(10) Patent No.: US 9,836,587 B2
(45) Date of Patent: Dec. 5, 2017

(54) SYSTEM AND METHOD FOR GRANTING PERMISSION FOR A MACHINE ACTION

(71) Applicant: 2236008 Ontario Inc., Waterloo (CA)

(72) Inventors: Daniel Cardamore, Kanata (CA); Wadih Jean Shaib, Kanata (CA)

(73) Assignee: 2236008 Ontario Inc., Waterloo (CA)

( * ) Notice: Subject to any disclaimer, the term of this patent is extended or adjusted under 35 U.S.C. 154(b) by 0 days.

(21) Appl. No.: 14/717,376

(22) Filed: May 20, 2015

(65) Prior Publication Data

US 2015/0339463 A1 Nov. 26, 2015

Related U.S. Application Data

(60) Provisional application No. 62/000,793, filed on May 20, 2014.

(51) Int. Cl.
*G06F 21/30* (2013.01)
*H04L 29/06* (2006.01)
(Continued)

(52) U.S. Cl.
CPC ............. *G06F 21/30* (2013.01); *G06F 21/51* (2013.01); *H04L 63/10* (2013.01); *H04W 4/005* (2013.01);
(Continued)

(58) Field of Classification Search
CPC ......... G06F 21/30; G06F 21/51; H04L 63/10; H04W 4/005; H04W 12/08
(Continued)

(56) References Cited

U.S. PATENT DOCUMENTS 6,125,399 A * 9/2000 Hamilton ............... H04L 29/06 370/392
8,296,320 B1 * 10/2012 Corbett ............... G06F 21/6218 707/781
(Continued)

FOREIGN PATENT DOCUMENTS

| EP | 2584753 A1 | 4/2013 |
|---|---|---|
| EP | 2725513 A1 | 4/2014 |
| WO | 2015052478 A1 | 4/2015 |

OTHER PUBLICATIONS

H. Williams "Five Myths about Hash Tables" Published Oct. 1, 2012, retrieved archived version from Oct. 6, 2012 on Jun. 6, 2017 at https://web.archive.org/web/20121006153747/http://hughewilliams.com:80/2012/10/01/five-myths-about-hash-tables/.*

(Continued)

*Primary Examiner* — Matthew Henning
(74) *Attorney, Agent, or Firm* — Gowling WLG (Canada) LLP (57) ABSTRACT

A system and method for granting permission for a machine action may receive a machine generated request, associated with a source, where the machine generated request comprises request parameters that include a requested machine action, a target recipient of the requested machine action, and the source of the requested machine action. Accessing a stored set of capabilities where each of the one or more capabilities comprises permission parameters that include a permissible action, a specified recipient of the permissible action, and a specified source of the permissible action. Examining the one or more capabilities in the stored set of capabilities and determining whether the request parameters associated with the machine generated request match the permission parameters associated with a capability of the one or more capabilities. Granting permission to apply the (Continued)

machine generated request to the target recipient when a match is determined.

18 Claims, 6 Drawing Sheets

(51) Int. Cl.
  *H04W 4/00* (2009.01)
  *H04W 12/08* (2009.01)
  *G06F 21/51* (2013.01)

(52) U.S. Cl.
  CPC ..... *H04W 12/08* (2013.01); *G06F 2221/2141* (2013.01)

(58) Field of Classification Search
  USPC .............................................................. 726/4
  See application file for complete search history.

(56) References Cited

U.S. PATENT DOCUMENTS

| | | | |
|---|---|---|---|
| 2001/0021928 A1* | 9/2001 | Ludwig | G06Q 20/3674 705/67 |
| 2004/0122877 A1* | 6/2004 | Nakayama | H04L 63/0807 708/200 |
| 2009/0049422 A1* | 2/2009 | Hage | G06F 8/10 717/104 |
| 2009/0247207 A1* | 10/2009 | Lor | H04L 29/12132 455/517 |
| 2012/0284702 A1 | 11/2012 | Ganapathy et al. | |
| 2014/0020064 A1* | 1/2014 | Hildebrand | G06F 21/335 726/4 |
| 2016/0352780 A1* | 12/2016 | Lang | H04L 63/0263 |

OTHER PUBLICATIONS

Extended European Search Report from corresponding EP application 15168529.4 dated Oct. 20, 2015.

* cited by examiner

| | User | Group | Other |
|---|---|---|---|
| Read | YES | YES | NO |
| Write | YES | NO | NO |
| Execute | YES | YES | NO |

PRIOR ART

Figure 6

SYSTEM AND METHOD FOR GRANTING PERMISSION FOR A MACHINE ACTION

BACKGROUND

1. Technical Field

The present disclosure relates to the field of granting permissions. In particular, to a system and method for granting permission for a machine action.

2. Related Art

Machine to machine (a.k.a. M2M) communication includes technologies that enable systems and devices to communicate with other systems and devices. The systems and devices include various types of machines that have both data handling and communications capabilities such as, for example, embedded computing devices (e.g. washing machine, automobile), sensors (e.g. thermostat) and service platforms (e.g. software update server).

The communication between the systems and devices may include, for example, the transmission of various data payloads, event notifications, signals and other forms of data transmission. One application of M2M communication that is attracting growing interest is granting permission for actions between systems and devices.

As the number and diversity of devices participating in M2M communication grow, numerous challenges arise for the infrastructure granting permissions. The challenges may include issues related to scalability, security, flexibility and minimizing device resource requirements. The scalability issues include managing a large number of permissions while granting or denying the actions quickly. Devices may need to be secured from unauthorized actions from other systems and devices on the communication network. The flexibility issues include managing permissions to add new permissions and modifying existing permissions. Minimization of device resource requirement may involve one or more resources related to computing capacity, memory footprint, power consumption and bandwidth consumption.

There is a need for a system and method for granting permission for a machine action that mitigates one or more of the challenges described above.

BRIEF DESCRIPTION OF DRAWINGS

The system and method for granting permission for a machine action may be better understood with reference to the following drawings and description. The components in the figures are not necessarily to scale, emphasis instead being placed upon illustrating the principles of the disclosure. Moreover, in the figures, like referenced numerals designate corresponding parts throughout the different views.

Other systems, methods, features and advantages will be, or will become, apparent to one with skill in the art upon examination of the following figures and detailed description. It is intended that all such additional systems, methods, features and advantages be included with this description and be protected by the following claims.

DETAILED DESCRIPTION

A system and method for granting permission for a machine action that mitigates one or more of the challenges described above is described therein. The system and method for granting permission for a machine action may receive a machine generated request, associated with a source, where the machine generated request comprises request parameters that include a requested machine action, a target recipient of the requested machine action, and the source of the requested machine action. A stored set of capabilities is accessed where each of the one or more capabilities comprises permission parameters that include a permissible action, a specified recipient of the permissible action, and a specified source of the permissible action. Each of the one or more capabilities may include a capability hash of the capability parameters calculated using a hash of the permissible action, the specified recipient of the permissible action, and the specified source of the permissible action. A request hash may be derived using the request parameters. Each of the one or more capabilities may be examined in the stored set of capabilities. A determination is made whether the request parameters associated with the machine generated request match the permission parameters associated with the capability. The request parameters associated with the machine generated request may be determined to match the permission parameters associated with the capability further when the request hash matches the capability hash. When a match is determined, permission is granted to apply the machine generated request to the target recipient.

The POSIX file system standard provides an example of how permission may be granted. POSIX® is a registered trademark of Institute of Electrical and Electronics Engineers. The POSIX IEEE Std. 1003.1 is incorporated herein by reference, except that in the event of any inconsistent disclosure or definition from the present specification, the disclosure or definition herein shall be deemed to prevail. The POSIX file system permission model defines which sources are allowed to apply a fixed set of actions to the target. The target may comprise, for example, a file in a file system. Three possible actions may be applied to the target that includes reading, writing and executing. Three groups of sources are defined: user, group and other. The POSIX permission model defines which owners are allowed to apply which of the three possible actions to the target. Whenever a read, write or execute actions is requested directed towards a target the POSIX permission model checks the source of the request and the desired actions to determine if the desired action is permissible. The permissions associated with the target may be modified over time but new actions and owners may not be added or deleted. The POSIX permission model provides for a limited set of pre-defined actions and users.

Figure 5:
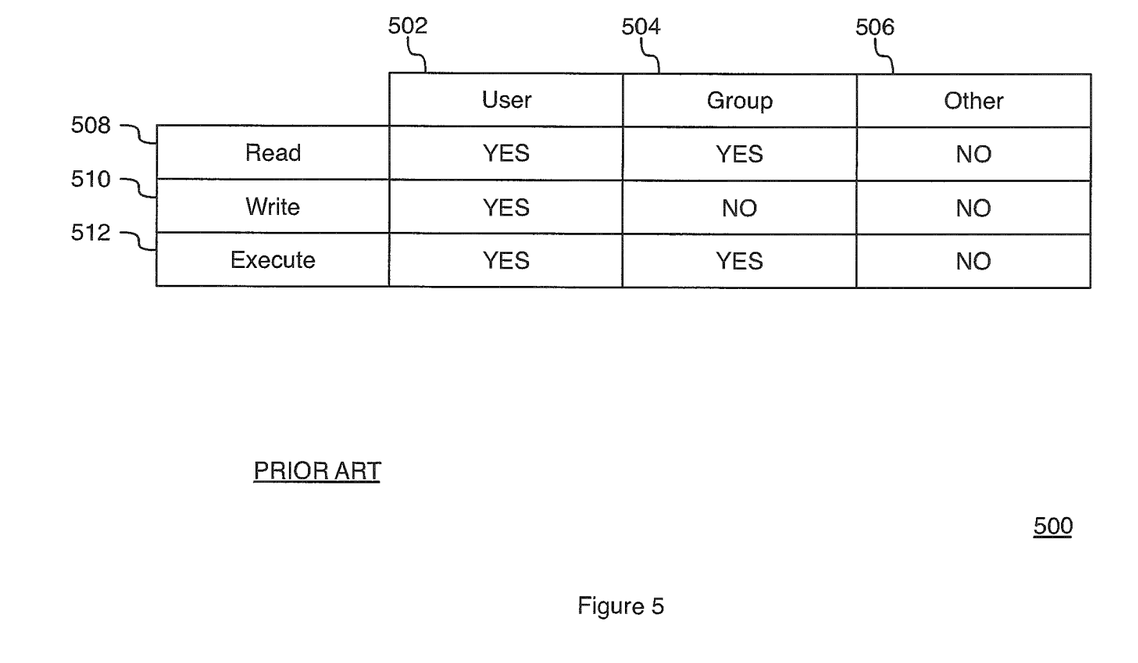
FIG. 5 is a schematic representation of a POSIX permission model.

FIG. 5 is a schematic representation of a POSIX permission model. The example system 500 may include a table where the columns include user 502, group 504 and other 506 and the rows include read 506, write 510 and execute 512. The table defines the permission for the target. The columns define the owner of the source request and the rows define the permissible actions applied to a target. When a source attempts to perform an action on the target, the permissions to perform the action may be determined from the content of the table. For example, permission for a source defined as user 502 requesting write 510 actions will be granted. In another example, permission for a source defined as other 506, requesting read 508 actions will not be granted.

U.S. Application No. 61/923,851, filed Jan. 6, 2014, System and Method for Machine-to-Machine Communication is incorporated herein by reference, except that in the event of any inconsistent disclosure or definition from the present specification, the disclosure or definition herein shall be deemed to prevail. U.S. Application No. 61/923,837, filed Jan. 6, 2014, System and Method for Distributing Software Updates is incorporated herein by reference, except that in the event of any inconsistent disclosure or definition from the present specification, the disclosure or definition herein shall be deemed to prevail.

Figure 1:
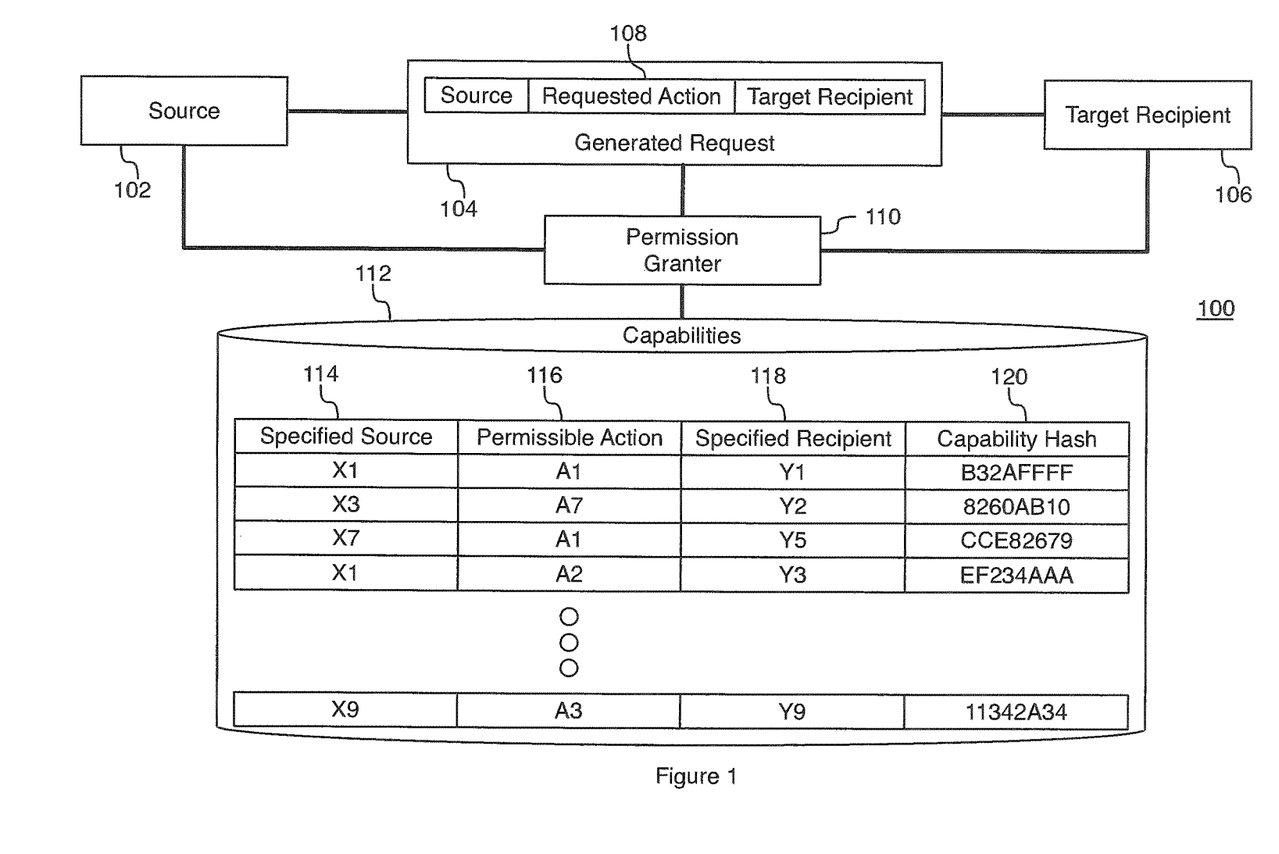
FIG. 1 is a schematic representation of a system for granting permission for a machine action.

FIG. 1 is a schematic representation of a system for granting permission for a machine action. The example system 100 may include a source 102 and a target recipient 106. The source 102 may send a machine generated request (e.g. generated request 104) communicating a requested machine action (e.g. requested action 108) to be applied to the target recipient 106. The source 102 and the target recipient 106 may be the same application, machine or attribute. The source 102 and the target recipient 106 may be identified using a unique identifier. The source 102 and the target recipient 106 may be identified using any one or more of an identifier of an application, an identifier of a machine and an identification attribute.

Machines associated with the identifier of a machine may be whole or a portion of a machine. The machines may include, for example, mobile devices (e.g. smart phone, computing tablets, media players), vehicles (e.g. automobiles, commercial transport vehicles, aircraft, watercraft), domestic appliances (e.g. washing machines, refrigerators, stoves, coffee makers), industrial equipment (e.g. wind turbines) and sensor equipped machines (e.g. thermostats, rainfall gauge, wind speed indicator). Each machine may include one or more of computing capability, data storage, sensors, state objects, access permissions, authentication mechanism, data communication capability, data encryption mechanism and other similar functions and capabilities.

Applications associated with the identifier of an application may be software applications or software processes. The applications may include, for example, applications executing on the machines associated with the identifier of a machine, applications executing using a network accessible server-based (a.k.a. cloud-based) architecture and general purpose computers (a.k.a. personal computers). In another example, a file system may be as application associated with the identifier of an application that manages date files.

The identification attribute may identify an attribute associated with the machine and/or the application. The identification attribute may include, for example, a user identification, a group identification, an organization identification and a programmable grouping identification. The user identification may be the owner of a machine or application. In one example, the machine may be an automobile where the user identification is the driver of the automobile. In another example, the application may be a software process executing on a processor in the automobile. The group identification may associate a group of machines or applications. In one example, all the automobiles with the same make and model may be identified in a single group. The organization identification may, for example, identify all the automobiles manufactured by the same company. A programmable grouping identification may associate an attribute, or tag, with any one or more machines and applications. The programmable grouping identification may associate related or unrelated machines and applications with an attribute.

The requested action 108 may include, for example, requests for creating, updating, deleting, messaging, applying software updates, and reading an associated state applied to the target recipient 106. The types of requested action 108 may depend on which actions may be associated with the source 108 and the target recipient 106. For example, an automotive manufacture, or organization identification (i.e. source 102), may request a software update be applied to a specific model of automobiles, or group identification (i.e. target recipient 106). The automotive manufacture may request to read the associated state, for example diagnostic information, from a specific automobile. In another example, an application (i.e. source 102) may request to create a file in a file system (i.e. target recipient 106). A software process that manages a hard disc drive may control the file system. In a third example, a coffee machine (i.e. source 102) may request to message a cloud-based application (i.e. target recipient 106) indicating that the coffee machine is out of water.

The information contained in the generated request 104 may be referred to as request parameters. The request parameters may include the source 104, the target recipient 106 and the requested action 108. Alternatively, the request parameters may include the request action 108 where the source 102 and the target recipient 106 are determined by other means. For example, when the source 102 communicates the generated request 104 to the target recipient 106 it may not be necessary to include the target recipient 106 as part of the generated request 104.

A stored set of capabilities 112 may include one or more capabilities where each capability describes a permissible action 116, a specified recipient 118 of the permissible action 116, and a specified source 114 of the permissible action. The information contained in each capability may be referred to as permission parameters. The specified source 114 and the specified recipient 118 may be any one or more of an identifier of an application, an identifier of a machine and an identification attribute. The permissible action 116 may include, for example, requests far creating, updating, deleting, messaging, applying software updates and reading the associated state applied to the specified recipient 118. The stored set of capabilities 112 may include all the possible permissible actions 116 for a specified source 114 to apply to a specified target 118. One specified recipient 118 may include a different number and types of permissible actions 116 when compared to a second specified recipient 118. The permissible actions 116 may not be a fixed predefined set and thereby different from the POSIX permissions model described above. New permissible actions 116 may be added dynamically at various times.

The stored set of capabilities 112 may be stored in a database, on a server or a local device. The stored set of capabilities 112 may be modified where capabilities are added, deleted or modified. The stored set of capabilities 112 may be distributed across multiple servers, devices or databases. Modifying the stored set of capabilities 112 may require sufficient privileges.

A permission granter 110 may determine if the generated request 108 may be applied to the target recipient 106. The permission granter 110 may determine if the generated request 104 matches a permissible capability in the stored set of capabilities 112. The permission grantor 110 may receive the generated request 108 and accesses the stored set of capabilities 112. For each of the one or more capabilities in the stored set of capabilities 112, the permission granter 110 may determine whether the request parameters associated with the generated request 104 matches the permission parameters associated with the capability. For example, the permission granter 110 may determine whether the source 102 matches the specified source 114, the requested action 108 matches the permissible action 116 and the target recipient 106 matches the specified recipient 118. When the source 102 and the specified source 114 utilized unique identifiers a match may be determined when the unique identifiers are the same.

In one example, a set of capabilities may be granted to a tag in a further example, a tag may be associated with one or more machines and then a generated request may be granted permissions against the tag and therefore against the one or more machines associated with the tag. Tags may allow efficient organization of capabilities including, for example, grouping sets of capabilities together, assigning capabilities to an entire group of users, modeling geographical units or business functions in an organization, allowing developers to have more access to beta/alpha groups of devices. Tags may be added to, for example, users, devices, supplication, and organization.

Table 1 contains some example capabilities. The contents of Table 1 are for illustrative purposes and are not intended to be limiting in any way.

TABLE 1

| Capability | Description |
|---|---|
| app.create | Create an application |
| app.create | Create an application |
| app.delete | Delete application |
| app.read | Read application metadata |
| app.read.by.org | Read applications in organisation |
| app.tag | Tag an application |
| app.untag | Untag an application |
| app.update | Update an application |
| cap.create | Create a capability on an entity |
| cap.delete | Delete a capability from an entity |
| cap.read | Read a capability |
| data.create | Create data associated with device |
| data.read | Read data associated with device |
| data.delete | Delete device data |
| data.retention.create | Create data retention rule |
| data.retention.delete | Delete data retention rule |
| data.retention.read | Read data retention rule |
| data.retention.read.by.app | Read data retention by application |
| data.retention.update | Update data retention rule |
| device.create | Create device |
| device.delete | Delete device |
| device.list.by.user.and.app | List all devices by user and application |
| device.read | Read device metadata |
| device.read.by.user | Read device associated to user |
| device.tag | Tag a device |
| device.untag | Untag a device |
| device.update | Update a device |
| dmsg.create.* | Deprecated. Use message.create instead. Send a direct message to a device |
| dmsg.delete | Deprecated. Use message.create instead. Delete a direct message |
| dmsg.read | Deprecated. Use message.create instead. Read a direct message |
| file.create | Create a file |
| file.delete | Delete a file |
| file.read | Read a file |
| file.update | Update a file |
| mail.create | Send an email |

TABLE 1-continued

| Capability | Description |
|---|---|
| message.create | Create a message. You usually require a message type defined (i.e., message.create.) with this capability |
| organization.read | Read an organization |
| organization.update | Update an organization |
| organization.tag | Tag an organization |
| organization.untag | Untag an organization |
| tag.create | Create a tag |
| tag.delete | Delete a tag |
| tag.read | Read a tag |
| tag.read.tagged.entities | Read tagged entities by tag |
| tag.update | Update a tag |
| user.read | Read a user |
| user.add.org | Add a user to an organization |
| user.remove.org | Remove a user from an org |
| user.read.by.org | Read users in organization |
| user.tag | Tag a user |
| user.untag | Untag a user |
| tag.grant | Required to tag with this tag |
| search.data | Search device data |
| search.device | Search devices |

An example of an expiring capability may be illustrated with a first user, Bob, borrowing a second user's, Alice's, car. Alice may park her car in a public lot, and Bob is going to pick it up after work. To make it easy for Bob to find her car, Alice gives Bob permission to read the GPS position of her car for the next 24 hours.

Figure 6:
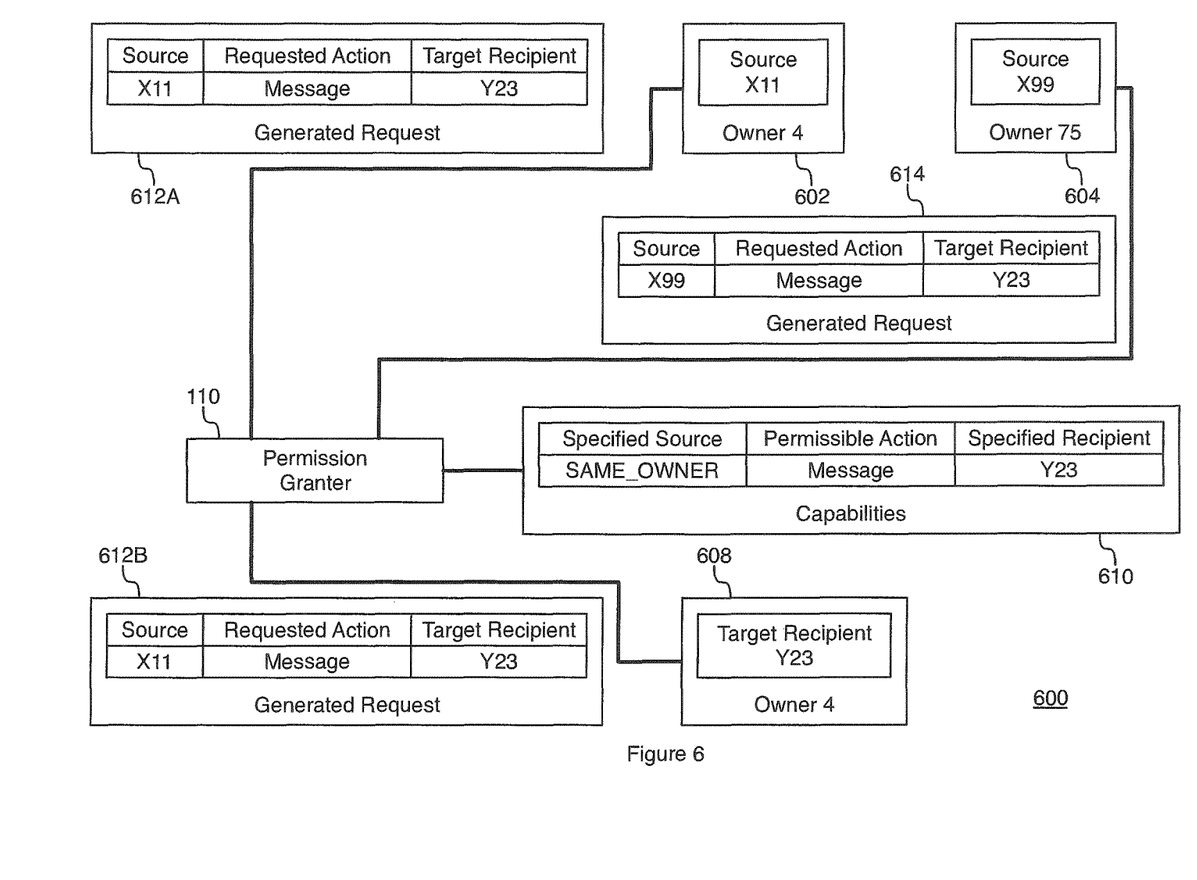
FIG. 6 is a further schematic representation of a system for granting permission for a machine action.

FIG. 6 is a further schematic representation of a system for granting permission for a machine action. The example system 600 may include the permission grantor 110, the capabilities 610, generated requests (612A, 612B, 614), owners (602, 604 and 608). Owner 602 may include the unique owner identifier 4, owner 4, and the source with the unique source identifier X11, or source X11. Owner 604 may include the unique owner identifier 75, owner 75, and the source with unique identifier X99, or source X99. Owner 608 the unique owner identifier 4, owner 4, and may include the target recipient with unique identifier Y23, or target recipient Y23. The source X11 and the target recipient Y23 have the same owner (Owner 4). The set of capabilities 610 may include one capability with the symbolic name SAME_OWNER as the specified source and the unique identifier Y23 as the specified recipient.

In a first example, source X11 may send a generated request 612A that may be intercepted by the permission granter 110. The permission granter 110 accesses the capabilities 610. The permission granter 110 matches the target recipient to the specified recipient with the same unique identifier Y23. The permission granter 110 matches the requested action to the permissible action. The permission granter 110 resolves the symbolic name SAME_OWNER in the Specified Source field to the value of the owner, owner 4, associated with the Specified Recipient Y23. The source X11 and target recipient Y23 both have the same unique owner identifier, owner 4, so in the example the owner of source X11 (owner 4) matches the determined value for the symbolic name SAME_OWNER in the Specified Source field of the capability. The permission granter 110 may determine that the generated request 612A matches a capability in the set of capabilities 610. The permission granter 110 may forward the generated request 612B to the target recipient 608.

In a second example, source X99 may send a generated request 614 that may be intercepted by the permission greater 110. The permission granter 110 accesses the capabilities 610. The permission granter 110 matches the target recipient to the specified recipient with the same unique identifier Y23. The permission granter 110 matches the requested action to the permissible action. The permission granter 110 resolves the symbolic name SAME_OWNER to owner 4 as described above. The source X99 and target recipient Y23 do not have the same unique owner identifier so in the example the owner of source X99 (owner 75) does not match the determined value (Owner 4) for the symbolic name SAME_OWNER in the Specified Source field of the capability. Source X99 has the unique owner identifier of owner 75 and the target recipient Y23 has the unique owner identifier of owner 4. The permission granter 110 may determine that the generated request 612A does not match a capability in the set of capabilities 610. The permission granter 110 may not grant permission for the generated request 614.

The foregoing describes the use and evaluation of an example symbolic name (SAME-OWNER) in determined the granting of permissions for a machine action. The example is intended to by non-limiting. Other similar symbolic names (e.g. SAME_NODE) may be used and evaluated in a similar manner in the system and method for granting permission for a machine action described herein.

The symbolic names, or associations, may be utilized as a way to assign capabilities. Associations may grant capabilities to entities that belong to the same user or organization. An association may be created that assigns a capability to devices or applications that belong to the same user or an organization. The capabilities granted to new entities based on how they relate to a user or the organization may be determined using an association. Associations may be used to grant capabilities based on the addition or removal of entities, such as users or devices. For example a specific application may share data with all other devices that belong to the same user or specific devices share their location data with all users in an organization. As the user adds more devices, the information is automatically shared between their devices or as users are added to or removed from an organization, the information for a specific device may be shared appropriately.

In one example, an association by user where a new device automatically gets access to another device owned by the same user. Alice, the user, may own a car that has an application running that shares its location. The application entity has associations created that grant data.read, dmsg.create.unlock, and dmsg.create.lock capabilities from Table 1 to other entities belonging to the same user. The data.read allows for other applications belonging to the same user to read the location of the car. The dmsg.create.unlock and dmsg.create.lock capabilities allow messages to be sent by other applications to unlock and lock the car, respectively. Alice may purchase a smart phone that has an application that also connects to the cloud. After Alice logs in to the application on the smart phone, the car can share its location because both devices are associated to the same user. Trying this out, Alice finds her car but realizes that she that she left the keys inside the car. Alice may send a message by generating a request to unlock the car using her smart phone. In this example, because both applications are associated to Alice, the location of car is shared with the new smart phone and the smart phone is permitted to send messages to the car. No additional configuration may be required.

The permission granter 110 may grant permission to apply the generated request 104 to the target recipient 106 when a match is determined. The permission grantor 110 may forward the generated request 104 to the target recipient 106. In one alternative, the permission granter 110 may signal the source 102 that the generated request 104 may be sent to the target recipient 106. In another alternative, the permission granter 110 may signal the target recipient 106 that the target recipient may process the generated request 104.

The set of capabilities may 112 may include more than one possible match of the request parameters associated with the generated request 104 and the permission parameters associated with the capability. The permission grantor 110 may grant permission when a first match is determined. In one embodiment, once permission has been granted, no more matched may be determined. In another embodiment, once permission has been granted more matched permissions may be determined. Multiple matches may grant permission to each source 102 in the generated request 104.

A subset of the set of capabilities 112 may be cached to reduce the size of the set of capabilities 112. For example, a subset of the set of capabilities 112 may be cached that includes, for example, the set of capabilities that include the same specified recipient 118. The permissions granter 110 may determine the target recipient 106 and access the cached subset of the set of capabilities 112 that includes the target recipient 106 that matches the specified recipient 118. The subset of the set of capabilities 112 may be associated with any one or more of the same specified source 114, the same permissible action 116 and the same specified recipient 118. In one example, the capabilities 112 may be stored in a cache utilizing a bloom filter. The bloom filter may be utilized to reduce the amount of time to verify if a capability does not exist when checking permissions. The bloom filter may provide false positives that a capability does exist. A second check of the capability may be made to determine that the capability does exist.

The source 102, the specified source 114, the target recipient 106 and the specified recipient 118 may be identified using a unique identifier or a symbolic name. The symbolic name may be, for example, defined as art environment variable. The symbolic name may be the same name or the same owner. For example, the source 102 and the target recipient 106 may have the same symbolic name, the permission granter 110 may resolve the symbolic name into a unique identifier in order to determine a match. Each of the one or more capabilities may include one or more unique identifiers for the specified source 114 and the specified recipient 118. For example, the specified source 114 may include both user identification and an identifier of an application. The permission granter 110 may determine a match when the source 102 matches both the user identification and an application associated with the specified source 114. In another example, the specified recipient 118 may be a group identification where the permissible action 116 applies to all of the target recipients 106 included in the group identification. The permissible actions 116 may be a software update that is to be applied to every recipient associated with the group identification. In yet another example, a symbolic name for the source 102 and target recipient 106 may be resolved into a unique identifier before a match is determined.

The permissible action 116 may include an application time or expiry time. The application time may indicate when the permissible action 116 may be applied to the specified recipient 118. The expiry time may indicate that the permissible action 116 may be applied to the specified recipient 118 before the time indicated in the expiry time but not afterward. The permission granter 110 may further limit granting permissions based on the application time or expiry time contained in the permissible action 116.

Each of the one or more capabilities may include a capability hash 120 of the capability parameters calculated using a hash of the permissible action 116, the specified recipient 118 of the permissible action 116, and the specified source 114 of the permissible action 116. One example hashing function may hash the unique identifier associated with the specified source 114 and the specified recipient and the permissible action 116 creating a single capability hash 120. The capability hash 120 may, for example, be 128-bits in length.

The permission granter 110 may derive a request hash of the request parameters using the same hashing method as the capability hash 120 described above. The permission granter 110 may determine whether the request parameters associated with the generated request 108 match the permission parameters associated with the capability by determining when the request hash matches the capability hash 120. The permission granter 110 may determine a match in a shorter amount of time when matching the capability hash 120 represented as a single number to the request hash. In one example, the hashing method may utilize two layers. A first layer may utilize an algorithm that provides a fast hash compare where some results have a false positive match. When a positive match is found in the first layer, a second layer may verify the result with an accurate hashing algorithm.

Figure 2:
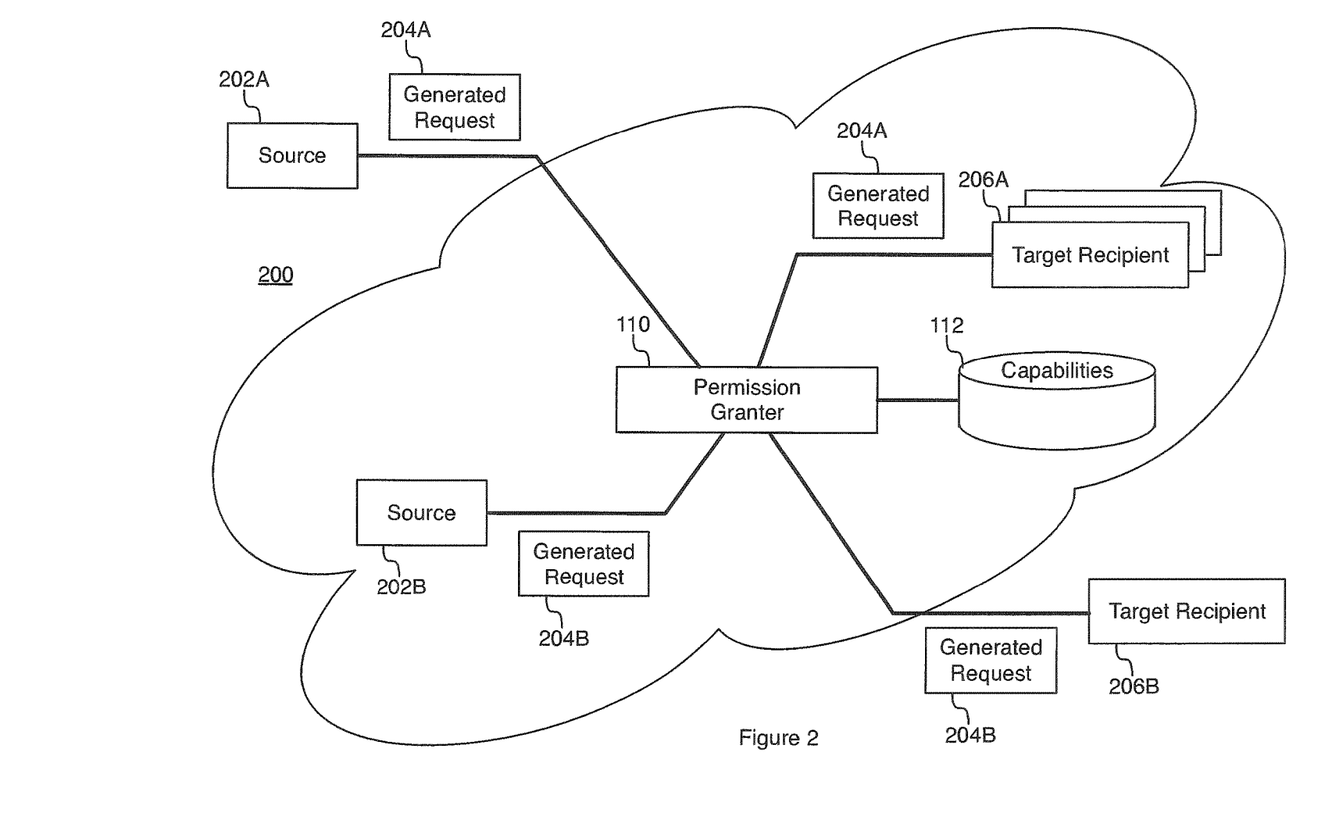
FIG. 2 is a further schematic representation of a system for granting permission for a machine action.

FIG. 2 is a further schematic representation of a system for granting permission for a machine action. The example system 200 may include the permission granter 110 and the set of capabilities 112 implemented using a network accessible server-based (a.k.a. cloud-based) architecture. The server-based architecture may include a single server, multiple co-located servers, multiple distributed servers, one or more tenancies on one or more multi-tenant servers, other similar architectures for providing network accessible services, and combinations of these architectures. The permission granter 110 and the set of capabilities 112 may be located in a network environment such as, for example, a public network (e.g. the Internet, a.k.a. the World Wide Web), a private network, (e.g. a corporate intranet), a virtual private network (VPN) or a combination of one or more of these. One or more permission grantors 110 and one or more sets of capabilities 112 may coexist within the server-based architecture.

The system 200 may include one or more sources (202A and 202B), one or more generated requests (204A and 204B) and one or more target recipients (206A and 206B). The one or more sources (204A and 204B) and the one or more target recipients (206A and 206B) may reside within the server-based architecture (e.g. 202B and 206A) or outside the server-based architecture (e.g. 202A and 206B). The server-based architecture provides data communication connectivity between the permission granter 110 and the one or more sources (202A and 202B) and one or more target recipients (206A and 206B). For example, the source 202A resides outside the server-based architecture and sends the generated request 204A to the target recipient 206A that resides inside the server-based architecture. The permission granter 110 may intercept the generated request 204A. The permission granter 110 may grant permission to the generated request 204A. The permission granter 110 may grant permission to the target recipient 206A to apply the generated request 204A. Alternatively, the source 202A may send the generated request 204A to the permission granter 110. The permission granter 110 may grant permission to the source 202A to send the generated request 204A to the target recipient 106A. In a second example, the source 202B resides inside the server-based architecture and sends the generated request 204B to the target recipient 206B that resides outside the server-based architecture.

Figure 3:
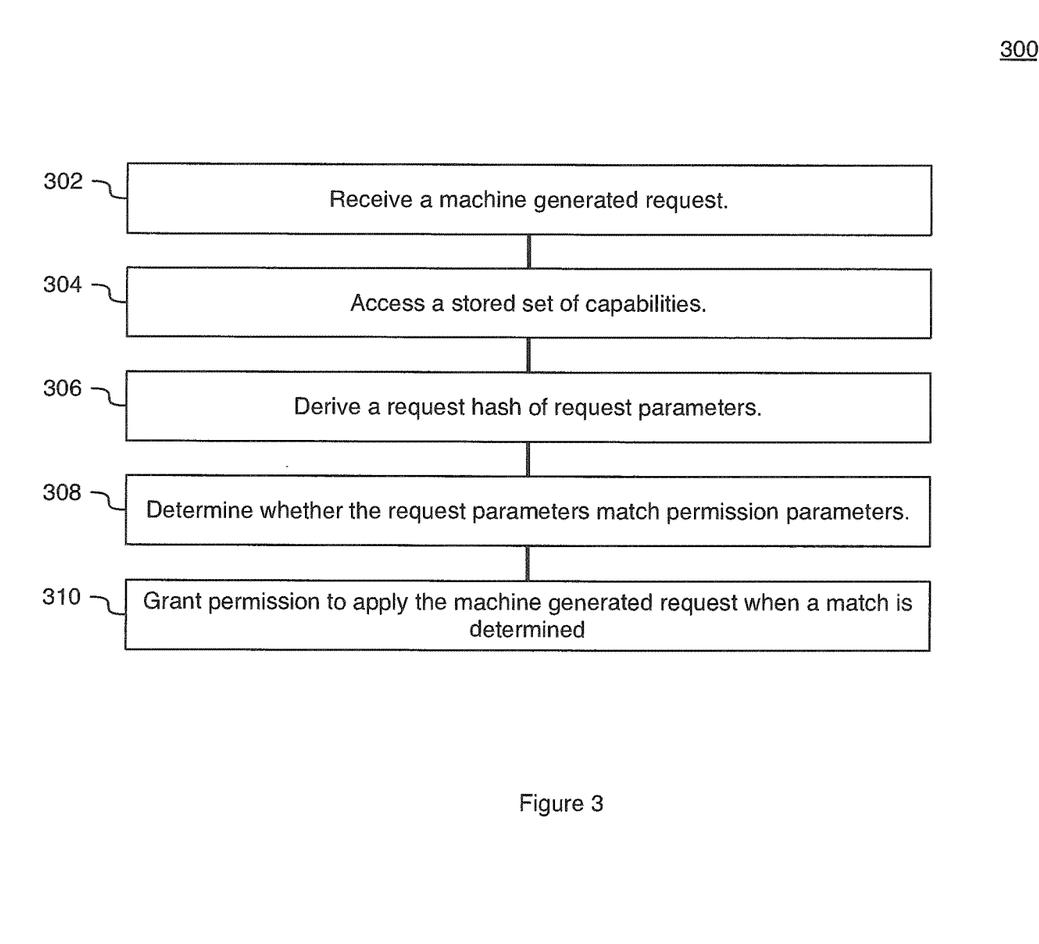
FIG. 3 is a representation of a method for granting permission for a machine action.

FIG. 3 is a representation of a method for granting permission for a machine action. The method 300 may be, for example, implemented using the systems 100, 200 and 400 described herein with reference to FIGS. 1 and 2. The method 300 may include the following acts. Receiving a machine generated request, associated with a source, where the machine generated request comprises request parameters that include a requested machine action, a target recipient of the requested machine action, and the source of the requested machine action 302. Accessing a stored set of capabilities where each of the one or more capabilities comprises permission parameters that include a permissible action, a specified recipient of the permissible action, and a specified source of the permissible action 304. Each of the one or more capabilities may optionally include a capability hash of the capability parameters calculated using a bash of the permissible action, the specified recipient of the permissible action, and the specified source of the permissible action. Optionally deriving a request hash of the request parameters 306. Examining the one or more capabilities in the stored set of capabilities and determining whether the request parameters associated with the machine generated request match the permission parameters associated with the capability 308. The request parameters associated with the machine generated request may be determined to match the permission parameters associated with the capability further when the request hash matches the capability hash. Granting permission to apply the machine generated request to the target recipient when a match is determined 310.

Figure 4:
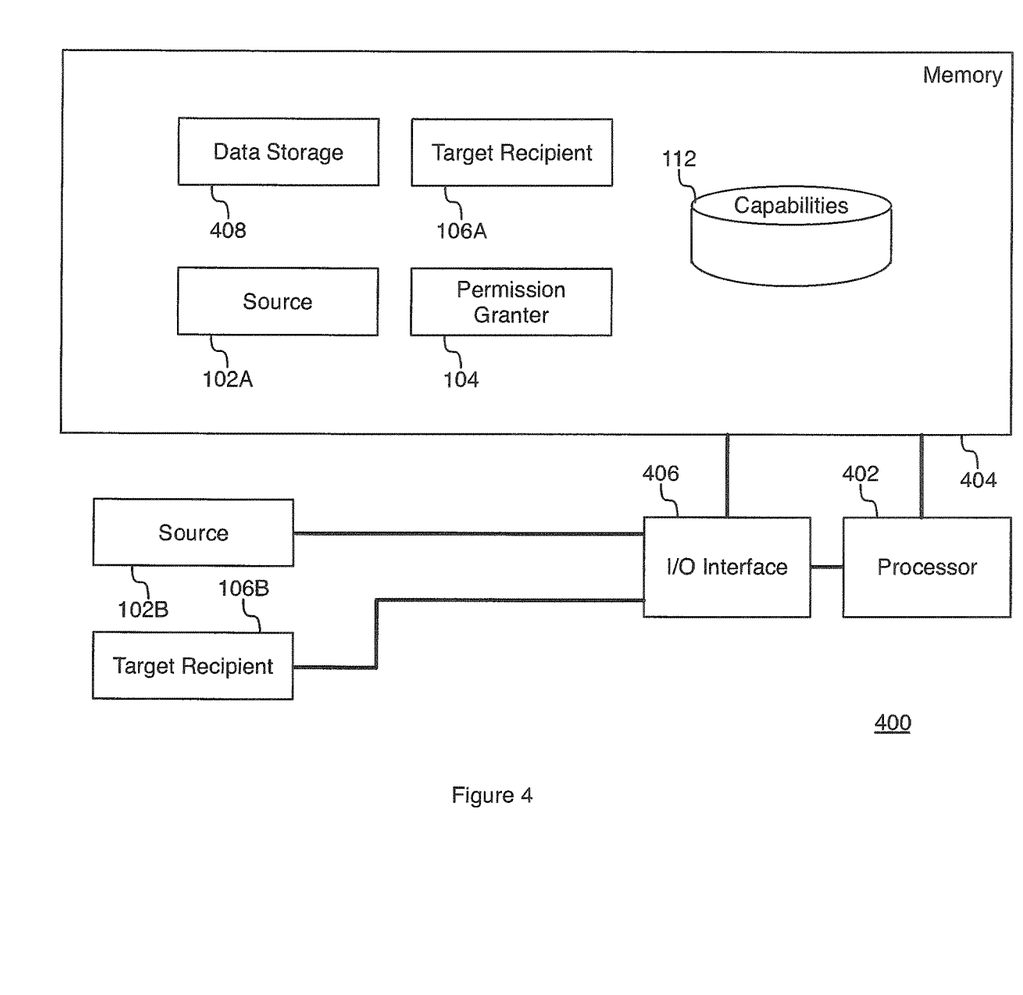
FIG. 4 is a further schematic representation of a system for granting, permission for a machine action.

FIG. 4 is a schematic representation of a system for granting permission for a machine action. The system 400 comprises a processor 402, memory 404 (the contents of which are accessible by the processor 402) and an I/O Interface 406. The memory 404 may store instructions which when executed using the processor 402 may cause the system 400 to render the functionality associated with the system and method for granting permission for a machine action and its components as described herein. In addition the memory 404 may store the source 102A, the target recipient 106A and the permission granter 104.

The processor 402 may comprise a single processor or multiple processors that may be disposed on a single chip, on multiple devices or distributed over more than one system. The processor 402 may be hardware that executes computer executable instructions or computer code embodied in the memory 404 or in other memory to perform one or more features of the system. The processor 402 may include a general purpose processor, a central processing unit (CPU), a graphics processing unit (GPU), an application specific integrated circuit (ASIC), a digital signal processor (DSP), a field programmable gate array (FPGA), a digital circuit, an analog circuit, a microcontroller, any other type of processor, or any combination thereof.

The memory 404 may comprise a device for storing and retrieving data, processor executable instructions, or any combination thereof. The memory 404 may include non-volatile and/or volatile memory, such as a random, access memory (RAM), a read-only memory (ROM), an erasable programmable read-only memory (EPROM), or a flash memory. The memory 404 may comprise a single device or multiple devices that may be disposed on one or more dedicated memory devices or or a processor or other similar device. Alternatively or in addition, the memory 404 may include an optical, magnetic (hard-drive) or any other form of data storage device.

The memory 404 may store computer code, such as, for example, computer code to render the functions of the source 102A, the target recipient 106A and the permission granter 104 as described herein. The computer code may include instructions executable with the processor 402, The computer code may be written In any computer language, such as C, C++, assembly language, channel, program code, and/or any combination of computer languages. The memory 404 may store information in data structures including, for example, information in data structures including device states, computing device states and other similar information. The data structures may be stored in the data storage 408.

The I/O interface 406 may be used to connect devices such as, for example, the source 102B, the target recipient 106B, and to other components of the systems 100 and 200.

All of the disclosure, regardless of the particular implementation described, is exemplary in nature, rather than limiting. The systems 100, 200 and 400 may include more, fewer, or different components than illustrated in FIGS. 1, 2 and 4. Furthermore, each one of the components of systems 100, 200 and 400 may include more, fewer, or different elements than is illustrated in FIGS. 1, 2 and 4. Flags, data, databases, tables, entities, and other data structures may be separately stored and managed, may be incorporated into a single memory or database, may be distributed, or may be logically and physically organized in many different ways. The components may operate independently or be part of a same program or hardware. The components may be resident on separate hardware, such as separate removable circuit boards, or share common hardware, such as a same memory and processor for implementing instructions from the memory. Programs may be parts of a single program, separate programs, or distributed across several memories and processors.

The functions, acts or tasks illustrated in the figures or described may be executed in response to one or more sets of logic or instructions stored in or on computer readable media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing, distributed processing, and/or any other type of processing. In one embodiment, the instructions are stored on a removable media device for reading by local, or remote systems. In other embodiments, the logic or instructions are stored in a remote location for transfer through a computer network or over telephone lines. In yet other embodiments, the logic or instructions may be stored within a given computer such as, for example, a CPU.

While various embodiments of the system and method for granting permission for a machine action have been described, it will be apparent to those of ordinary skill in the art that many more embodiments and implementations are possible within the scope of the present invention. Accordingly, the invention is not to be restricted except in light of the attached claims and their equivalents.

The invention claimed is:

1. A method performed within a network accessible server-based architecture for granting permission for a machine action comprising:

receiving, at one or more processing devices, a machine generated request associated with a source, where the machine generated request comprises request parameters that include a requested machine action, a target recipient of the requested machine action, and the source of the requested machine action;

deriving a request hash of the request parameters;

accessing with the one or more processing devices a stored set of capabilities on a memory operably coupled to the one or more processing devices, the memory comprising a device for storing and retrieving data, where each of the one or more capabilities comprises a capability hash of permission parameters that include a permissible action, a specified recipient of the permissible action, and a specified source of the permissible action;

for each of the one or more capabilities in the stored set of capabilities:

determining with the one or more processing devices whether the request hash of the request parameters associated with the machine generated request match the capability hash of the permission parameters associated with the capability; and granting permission to apply the machine generated request to the target recipient when a match of the request hash and the capability hash is determined wherein at least one of the source and the target recipient reside outside of the network accessible server-based architecture.

2. The method for granting permission for a machine action of claim 1, where the source, the specified source, the target recipient and the specified recipient comprises any one or more of an identifier of an application, an identifier of a machine and an identification attribute.

3. The method for granting permission for a machine action of claim 1, where the requested machine action comprises applying to the target recipient any one or more action of: creating, updating, deleting, messaging, applying software updates and reading an associated state.

4. The method for granting permission for a machine action of claim 1, further comprising adding, deleting or modifying one or more capabilities to the stored set of capabilities.

5. The method for granting permission for a machine action of claim 1, where any of the source, the specified source, the target recipient and the specified recipient is identified using a unique identifier.

6. The method for granting permission for a machine action of claim 1, where any of the source, the specified source, the target recipient and the specified recipient comprises a symbolic name.

7. The method for granting permission for a machine action of claim 6, further comprising resolving the symbolic name into a unique identifier.

8. The method for granting permission for a machine action of claim 7, where the symbolic name is resolved into the unique identifier before a hash is calculated.

9. The method for granting permission for a machine action of claim 7, where the symbolic name is resolved into a unique identifier before determining the match between the request hash and the capability hash.

10. A system implemented using a network accessible server-based architecture for granting permission for a machine action comprising:

one or more processing devices; and a memory operably coupled to the one or more processing devices, the memory comprising a device for storing and retrieving data, wherein the memory stores instructions to be executed by the one or more processing devices, the instructions for configuring the system to:
- receive at the one or more processing devices a machine generated request, associated with a source, where the machine generated request comprises request parameters that include a requested machine action, a target recipient of the requested machine action, and the source of the requested machine action;
- derive a request hash of the request parameters;
- access with the one or more processing devices a stored set of capabilities on the memory, where each of the one or more capabilities comprises a capability hash of permission parameters that include a permissible action, a specified recipient of the permissible action, and a specified source of the permissible action;
- for each of the one or more capabilities in the stored set of capabilities:
  - determine with the one or more processing devices whether the request hash of the request parameters associated with the machine generated request match the capability hash of the permission parameters associated with the capability; and
  - grant permission to apply the machine generated request to the target recipient when a match of the request hash and the capability hash is determined
- wherein at least one of the source and the target recipient reside outside of the network accessible server-based architecture.

11. The system for granting permission for a machine action of claim 10, where the source, the specified source, the target recipient and the specified recipient comprises any one or more of an identifier of an application, an identifier of a machine and an identification attribute.

12. The system for granting permission for a machine action of claim 10, where the requested machine action comprises applying to the target recipient any one or more action of: creating, updating, deleting, messaging, applying software updates and reading an associated state.

13. The system for granting permission for a machine action of claim 10, further comprising adding, deleting or modifying one or more capabilities to the stored set of capabilities.

14. The system for granting permission for a machine action of claim 10, where any of the source, the specified source, the target recipient and the specified recipient is identified using a unique identifier.

15. The system for granting permission for a machine action of claim 10, where any of the source, the specified source, the target recipient and the specified recipient comprises a symbolic name.

16. The system for granting permission for a machine action of claim 15, further comprising resolving the symbolic name into a unique identifier.

17. The system for granting permission for a machine action of claim 16, where the symbolic name is resolved into the unique identifier before a hash is calculated.

18. The system for granting permission for a machine action of claim 16, where the symbolic name is resolved into a unique identifier before determining the match between the request hash and the capability hash.

* * * * *